United States Patent [19]
Oliver

[11] 3,919,819
[45] Nov. 18, 1975

[54] SELF LOCKING PANEL CONNECTOR

[76] Inventor: Wayne H. Oliver, 1305 Spring Valley Road, Minneapolis, Minn. 55422

[22] Filed: Oct. 4, 1974

[21] Appl. No.: 512,356

Related U.S. Application Data

[63] Continuation-in-part of Ser. No. 330,057, Feb. 6, 1973, abandoned.

[52] U.S. Cl. .................. 52/233; 52/271; 52/580; 52/584; 52/753 Y; 403/231; 403/382
[51] Int. Cl.² .................. E04B 1/08; E04C 1/10
[58] Field of Search ............ 52/270, 233, 584, 271, 52/753 D, 580, 753 Y, 288, 753 C, 582, 668, 593, 664, DIG. 2; 217/65; 46/31; 403/382, 231

[56] References Cited
UNITED STATES PATENTS

| | | | |
|---|---|---|---|
| 695,677 | 3/1902 | Faris | 217/65 X |
| 864,801 | 9/1907 | Richards | 52/284 |
| 1,418,257 | 5/1922 | Hay | 52/582 X |
| 1,648,591 | 11/1927 | Repay | 217/65 |
| 1,655,662 | 1/1928 | Repay | 52/753 C |
| 1,882,678 | 10/1932 | Thum | 52/753 D |
| 1,883,214 | 10/1932 | Wilson et al. | 52/593 X |
| 2,497,657 | 2/1950 | Cole | 46/31 |
| 2,509,732 | 5/1950 | Ernestus | 52/668 X |
| 2,611,460 | 9/1952 | Nash | 403/382 |
| 2,832,100 | 4/1958 | Swallert | 52/753 C X |
| 3,051,277 | 8/1962 | Day | 52/270 X |
| 3,066,436 | 12/1962 | Schuh | 46/30 |
| 3,070,646 | 12/1962 | Lindgren | 52/753 Y |
| 3,133,326 | 5/1964 | Budny | 52/288 |
| 3,301,149 | 1/1967 | Box | 52/580 X |
| 3,552,079 | 1/1971 | Mortensen | 52/233 X |
| 3,559,356 | 2/1971 | Konal | 52/288 X |
| 3,662,507 | 5/1972 | Espeland | 52/270 |
| 3,820,294 | 6/1974 | Parker | 52/271 X |

FOREIGN PATENTS OR APPLICATIONS

| | | | |
|---|---|---|---|
| 477,844 | 10/1969 | Switzerland | 52/753 C |

Primary Examiner—Frank L. Abbott
Assistant Examiner—Leslie A. Braun
Attorney, Agent, or Firm—Merchant, Gould, Smith, Edell, Welter & Schmidt

[57] ABSTRACT

Self-locking connector elements at opposite ends of elongated panels for interlocking superposed panels with others at angles thereto, to provide wall structure for enclosures of various types. The connector elements each have a pair of laterally spaced side wall portions connected at one end by a transverse wall portion. The side wall portions are secured to an end of a given panel, parallel to opposite sides of the panel, with the transverse wall portion disposed in longitudinally outwardly spaced relation to the adjacent end of the panel, the panel end and wall portions forming an open ended passageway. The side and transverse wall portions of each connector element have slots extending from an end of the wall portion toward the opposite end, some of these slots being positioned to receive slotted portions of a connector element on the end of another panel disposed at right angles to the given panel. The side wall portions are provided end connector portions at their opposite ends and intermediate connector portions generally centrally between the opposite ends for interconnection with the end connector portions of connector elements of adjacent panels.

8 Claims, 12 Drawing Figures

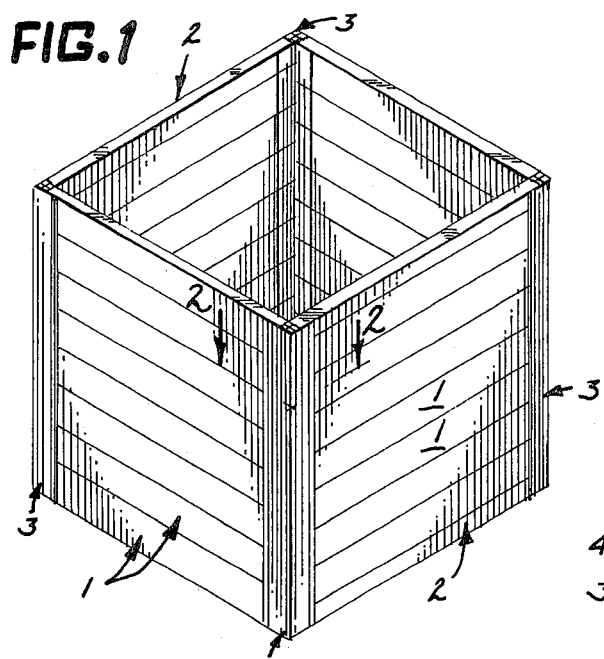
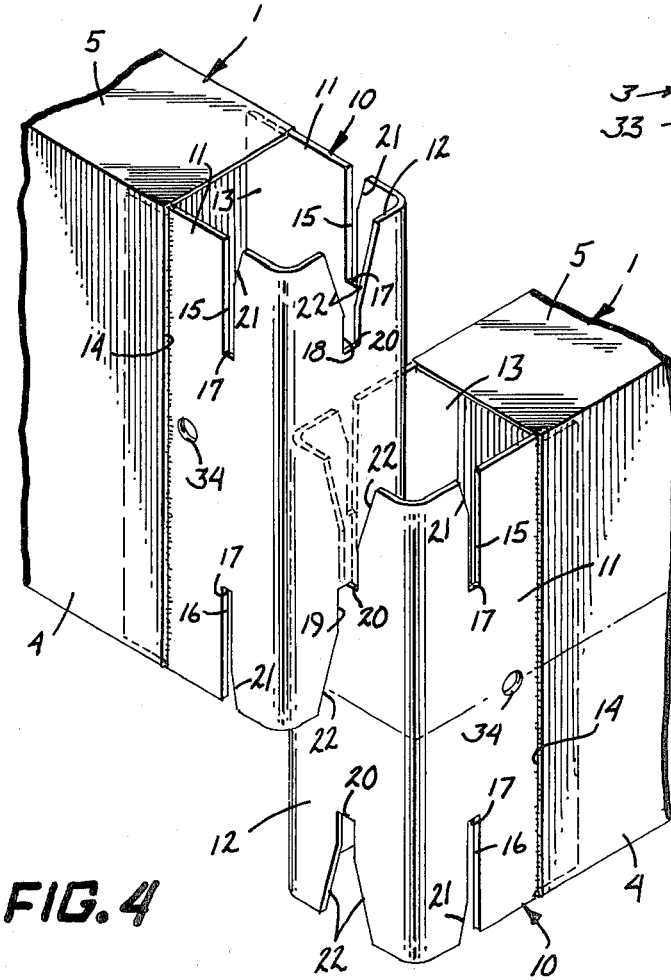
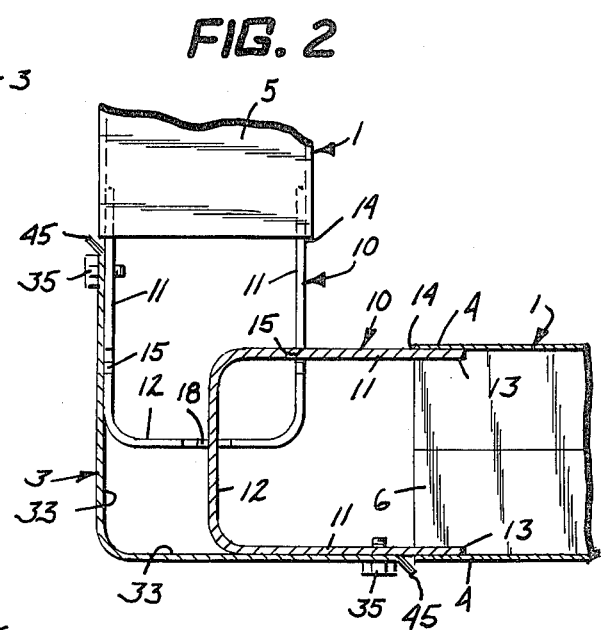
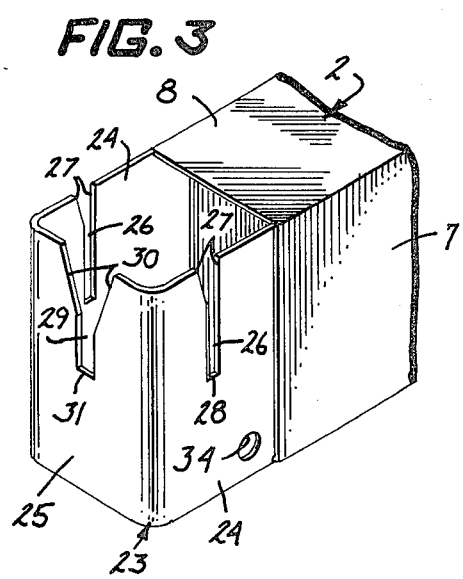

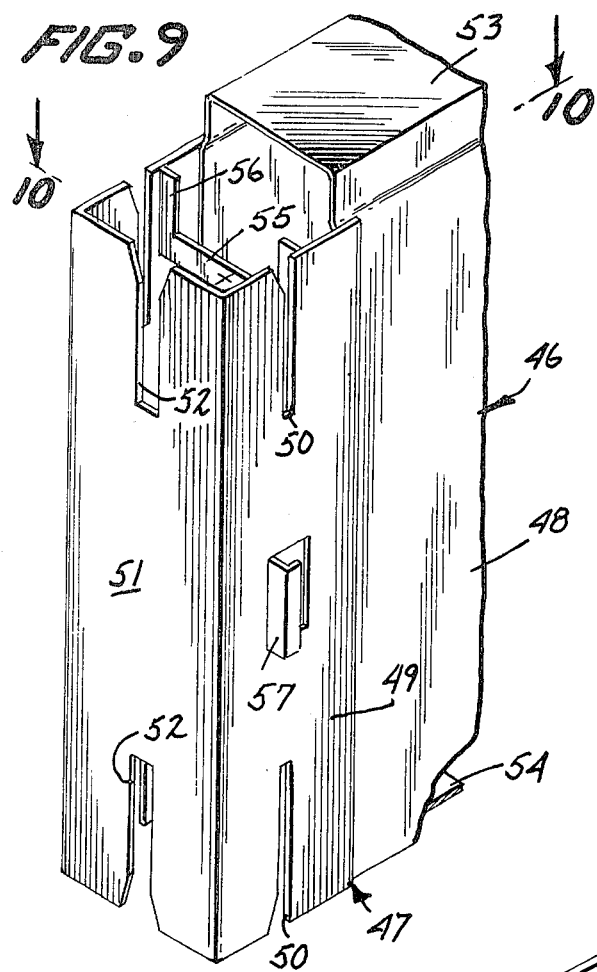
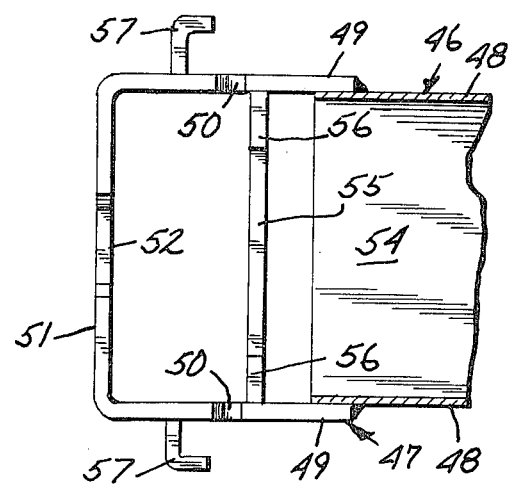
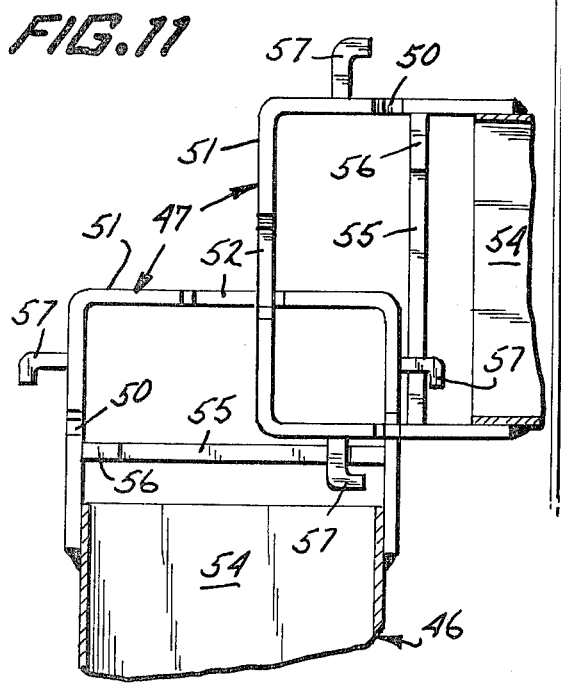
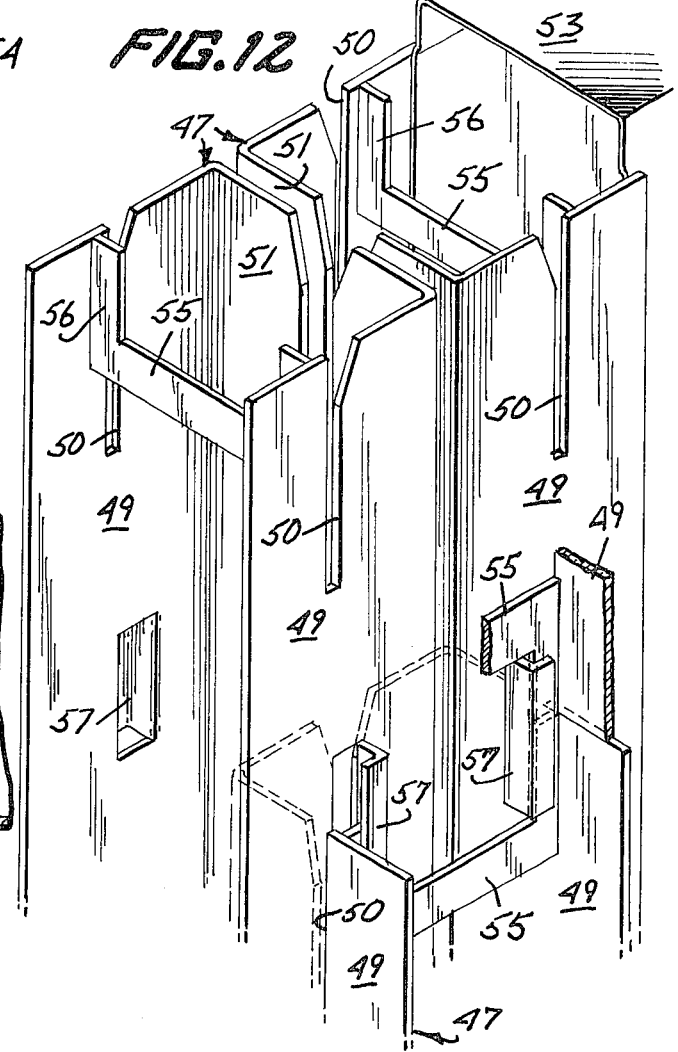

SELF LOCKING PANEL CONNECTOR

This is a continuation-in-part of my copending application entitled "Self-Locking Panel Connector" which was filed on Feb. 6, 1973 under Ser. No. 330,057 now abandoned.

BACKGROUND OF THE INVENTION

My present invention relates generally to panel construction used in the erecting of generally rectangular enclosures, such as storage bins; and more particularly to connector devices for securing panels together in the building of such structures. Further, this invention is in the nature of a substantial departure from structures disclosed in my prior U.S. Pat. Nos. 3,279,140; 3,375,631; and 3,521,420.

SUMMARY OF THE INVENTION

An important object of this invention is the provision of a connector element for panels which allows the panels to be quickly and easily assembled to form an enclosure and which rigidly interlocks adjacent panels against relative movement.

Another object of this invention is the provision of panel and connector construction which can be assembled to provide a weather-tight enclosure from which stored material, such as grain or the like, will not leak.

To the above, and further ends, I provide a wall panel in the form of an elongated cross-sectionally rectangular tube having opposite inner and outer side walls and opposite top and bottom edge surfaces, whereby the panels may be disposed in superimposed engagement. The connector elements of this invention are of cross-sectionally generally U-shaped to provide spaced generally parallel side wall portions and transverse wall portions connecting one end of the side wall portions. The opposite ends of the side wall portions of a given connector element are rigidly connected to the side walls of a panel at one end with the transverse wall portion being longitudinally outwardly spaced from the adjacent end of the panel. The connector element and adjacent end of the panel define an open ended normally generally vertical passageway extending from one of the edge surfaces of the panel toward the other edge surface thereof. Each of the side and transverse wall portions is formed to provide at least one slot extending from one end of the passageway toward the other end. Each of the slots has its bottom disposed in spaced relation to the opposite end of its connector element. The slots of the transverse wall portion and one of the side wall portions of one connector element are arranged to receive the transverse wall portion and one of the side wall portions of another connector element beyond the bottoms of its slots when their respective panels are moved into interlocking relationship at generally right angles to each other. The slots are so shaped that assembly of a panel wall is quickly and easily achieved; and the size and location of the slots of each connector element are such that a joint is obtained, between interconnected pairs of the connector elements, that is substantially leak-proof as far as grain or like granular material is concerned. The connector elements enable all of the side walls of an enclosure to be interlocked without the use of screws or similar fastening devices. However, the present invention does contemplate closure strips to provide a finished appearance at joints and exterior corners as well as adding rigidity to the wall structure, these strips being fastened to the connector elements with screws or like anchoring devices. At least one of the side wall portions of each connector element includes end connector portions at the opposite ends thereof, and intermediate connector portions generally centrally between the opposite ends, for interconnection between an end connector portion of one connector element with the intermediate connector portion of a connector element interconnected therewith when the panels of said connector elements are disposed in their interlocking relationship at generally right angles to each other.

DESCRIPTION OF THE DRAWINGS

FIG. 1 is a view in perspective of an enclosure comprising panels, connector elements and closure strips produced in accordance with this invention;

FIG. 2 is an enlarged fragmentary section taken on the line 2—2 of FIG. 1;

FIG. 3 is a fragmentary view in perspective of one of the panels and connector elements of this invention;

FIG. 4 is a fragmentary view in perspective of a pair of interconnected panels with the connector elements thereof disposed in interlocking relationship;

FIG. 9 is a fragmentary view in perspective of a wall panel showing a modified form of connector element;

FIG. 10 is a fragmentary view partly in plan and partly in section, taken substantially on the line 10—10 of FIG. 9;

FIG. 11 is a view corresponding to FIG. 10 but showing a pair of connector elements jointed together with the panels thereof at right angles to each other; and FIG. 12 is a fragmentary view in perspective of a pair of aligned panels jointed to a third panel at right angles to said aligned panels.

DETAILED DESCRIPTION OF THE PREFERRED EMBODIMENT

Figure 5:
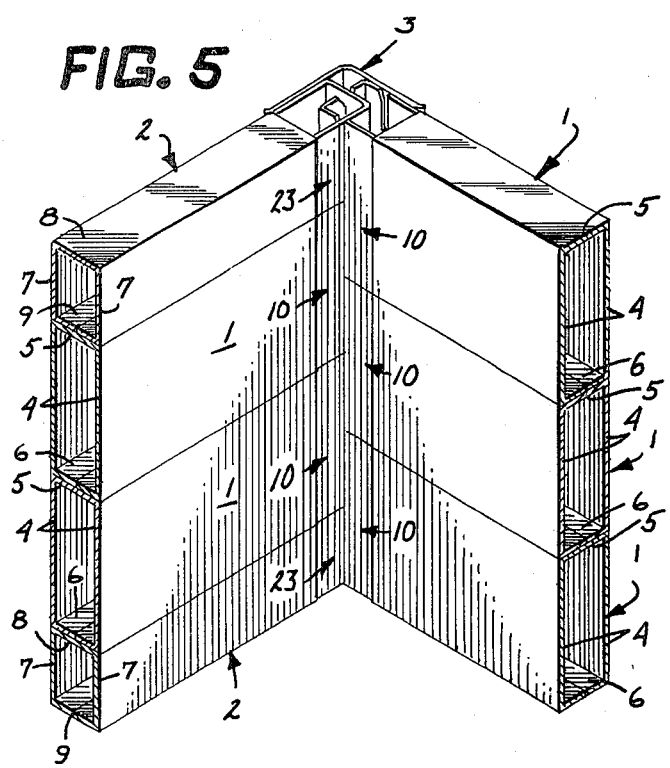
FIG. 5 is an enlarged fragmentary view in perspective corresponding to a portion of FIG. 1.

In the arrangement illustrated in FIGS. 1-5, an open topped generally rectangular enclosure is shown as comprising a plurality of elongated cross-sectionally rectangular tubular panels 1, a plurality of cross-sectionally rectangular tubular panels 2 and elongated closure members or strips 3. Each of the panels 1 has opposed parallel side walls 4 and top and bottom walls 5 and 6 respectively, the panels 2 having opposite side walls 7 and top and bottom walls 8 and 9 respectively. As shown particularly in FIGS. 1 and 5, the top and bottom walls 5 and 6 as well as the top and bottom walls 8 and 9, define flat parallel outer edge surfaces that are disposed in face-to-face engagement with corresponding edge surfaces of underlying or overlying ones of the panels 1 and 2. Preferably, each of the tubular panels 1 and 2 is formed from suitable sheet metal, such as aluminum or steel, although it will be appreciated that these may be fabricated from other material, such as synthetic plastics, if desired.

Each panel 1 is provided at its opposite ends with a pair of like connector elements indicated generally at 10, each connector element being cross-sectionally generally U-shaped and having side wall portions 11 and transverse wall portions 12 connecting the side wall portions 11. The outer edge portions of the side wall portions 11, indicated at 13, are disposed within adjacent end portions of the side walls 4 and are welded or otherwise rigidly secured thereto, as indicated at 14. The side wall portions 11 are parallel to the panel walls 4, and the transverse wall portion 12 of each connector element 10 is disposed in longitudinally outwardly spaced relationship to the adjacent end of its respective panel 1, so that each connector element 10 cooperates with the adjacent end of its respective panel 1 to define an open ended passageway that extends from the bottom wall 6 of each panel 1 to the top wall 5 thereof. Preferably, and as shown, the opposite ends of each connector element 10 are substantially coplanar with top and bottom surfaces respectively of the top and bottom walls 5 and 6, these being the aforementioned edge surfaces of the panels 1. With reference particularly to FIG. 4, it will be seen that the outer edge portions 13 are somewhat reduced in length from their respective wall portions 11, so that the edge portions 13 are easily fitted into the adjacent end portions of their respective panels 1. The connector elements 10 may be made from any suitable material, but are preferably formed from sheet metal of substantially heavier gauge than that of the panels 1 and 2.

Each of the side wall portions 11 of each connector element 10 is formed to provide a pair of aligned notches or slots 15 and 16, the former opening upwardly to the upper end of its respective side wall 11, and the latter opening downwardly to the bottom end of its respective side wall 11. Each of the slots 15 and 16 has an inner end or bottom 17, the bottoms 17 of aligned pairs of slots 15 and 16 being spaced apart a distance equal to one-half of the vertical dimension of its respective panel 1, or one-half the distance between the top and bottom edge surfaces defined by the walls 5 and 6 thereof. In like manner, the transverse wall portion 12 of each connector element 10 is formed to provide a pair of longitudinally extending aligned notches or slots 18 and 19 that open outwardly to the upper and lower ends respectively of the connector element 10. The slots 18 and 19 have inner ends or bottoms 20 that are level with the bottoms 17 of the slots 15 and 16 respectively. Those portions of each of the connector elements 10 which define the outer end portions of the slots 15, 16, 18 and 19, are formed so that the outer end portions of said slots diverge outwardly, as indicated at 21 with respect to the slots 15 and 16, and at 22 with respect to the slots 18 and 19, for ease of assembly of the paneled structure. The slots 15 and 16, inwardly of their diverging outer side portions 21 have a width only slightly greater than the thickness of the wall portions 11 and 12, the slots 18 and 19, inwardly of their diverging portions 22 having a width slightly greater than twice the thickness of the wall portions 11 and 12, for a purpose will hereinafter appear.

The panels 2 have a vertical dimension between the top and bottom walls 8 and 9 thereof that is one-half of the vertical dimension of each panel 1. Each panel 2 is provided at its opposite ends with a pair of identical connector elements 23 that are similar in cross-sectional shape and size to the connector elements 10, but differing from the connector elements 10 in being only one-half as long as the connector elements 10 and having slots at one end only. As shown in FIG. 3, each connector 23 is formed to provide laterally spaced side wall portions 24 and a transverse portion 25, the side wall portions 24 being welded or otherwise rigidly secured to the panel side walls 7. The side wall portions 24 are each provided with an upwardly opening notch 26 having a diverging upper end portion 27 and a bottom 28, the transverse wall portion 25 having an upwardly opening slot 29 formed to provide an upwardly diverging upper end portion 30 and a bottom 31. The slots 26 are identical in size and shape to the slots 15 and 16, the slots 29 being identical to the slot 18 in each connector element 10. It should be here noted that the slots 15 and 16 in the connector elements 10 are spaced from their respective transverse wall portions 12 a distance equal to one-half of the distance between opposite side wall portions 11; and that the slots 26 in the connector elements 23 are similarly spaced from their respective transverse wall portion 25. The slots 15, 16, and 26, inwardly of their diverging outer end portions, each have a width that is only slightly greater than the thickness of the wall portions 11, 12, 24 and 25. The slots 18, 19 and 29, inwardly of their diverging outer end portions, are of a width somewhat greater than twice the thickness of the wall portions 11, 12, 24 and 25; all for a purpose which will hereinafter become apparent.

The building of an enclosure of the type shown in FIG. 1 is accomplished by first setting a pair of panels 2 upon the ground or suitable foundation, not shown, in laterally spaced generally parallel relationship. A panel 1 is then connected at its opposite ends to one end of each of the panels 2, and a second panel 1 is connected to the opposite ends of the panels 2 to form a rectangular ring. Thereafter, other panels 1 are superimposed on the panels 2, and still other panels are superimposed on the lowermost panels 1 to form a second loop or ring of panels; and the same procedure is followed with successive rings of material until the desired height of container is reached.

The connecting of a pair of adjacent panels 1 to form a corner of the container or enclosure is illustrated in FIGS. 2 and 4. In connecting the panels 1 together at right angles to each other, the slots 16 and 19 of the upper one of the connector elements 10 are aligned with respective ones of the slots 15 and 18 of the lower connector element 10. The upper panel 1 is then lowered until the slots 16 and 19 of the upper panel 1 bottoms in the slots 15 and 18 respectively of the lower panel 1. Thus, each wall portion receiving slot of each connector element receives a wall portion 11 or 12 of the cooperating connector element 10 longitudinally inwardly of the bottoms 17 and 20 of the respective slots. The slots 15, 16, 18 and 19 are of such depth that, when the bottoms 17 and 20 are interengaged, the upper one of the panels 1 are in face-to-face engagement with an underlying one of the panels 1 or 2, as shown in FIGS. 1 and 5. Further, the depth of the various slots disposes adjacent panels 1 in a ring thereof in vertically staggered relationship. Thus, a pair of panels 2 are disposed at opposite sides of the lowermost ring of panels, and an additional pair of panels 2 are disposed at opposite sides of the uppermost ring of panels in a given enclosure, such as shown in FIGS. 1 and 5, to obtain a level top edge of the enclosure.

The diverging outer end portions of the several slots 15, 16, 18, 19, 26, and 29 enable the connector elements to be easily assembled, and the greater width of the slots 18, 19 and 29 compensate for any inaccuracies that may occur in the fabrication of the several panels 1 and 2 with their respective connector elements 10 and 23. It will be noted, with reference to FIG. 5, that, when the several panels 1 and 2 are assembled, there are no gaps of appreciable size where the slots 15 and 16 engage the cooperating wall surfaces of adjacent connector elements 10 and 23. With the above-described arrangement, all of the panels 1 and 2 are interlocked against all but vertical movements relative to each other.

For the purpose of enhancing the appearance at the outer corners of the enclosure of FIGS. 1 and 5, as well as for adding rigidity to the assembly and preventing vertical movements of the panels 1 and 2 relative to each other, I provide the elongated closure members or strips 3 of sheet metal or other suitable material. Each closure strip 3 is of a length equal to the intended height of the enclosure and is bent intermediate its longitudinal edges to provide laterally spaced inner surface portions 33 at right angles to each other for face-to-face engagement with angularly spaced side wall portions 11 of superposed ones of the connector elements 10 and 23. As shown in FIG. 4, the side wall portions of the connector elements 10 are provided with threaded holes 34 that are aligned with suitable openings in the closure strip 3, for reception of locking screws or the like 35. The connector elements 23 are likewise provided with threaded openings 34, as shown in FIG. 3.

Figure 6:
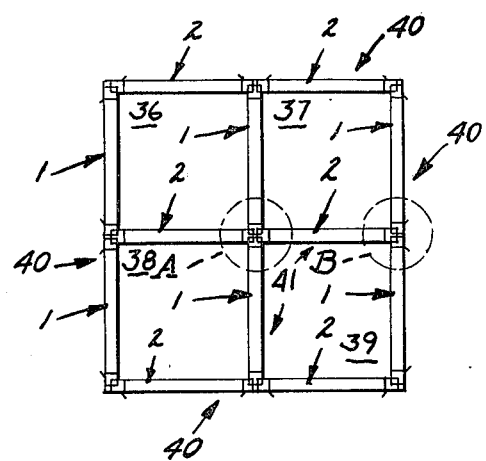
FIG. 6 is a view in top plan, on a reduced scale, of a modified arrangement, utilizing the panels and connector elements of FIGS. 1-5.
Figure 7:
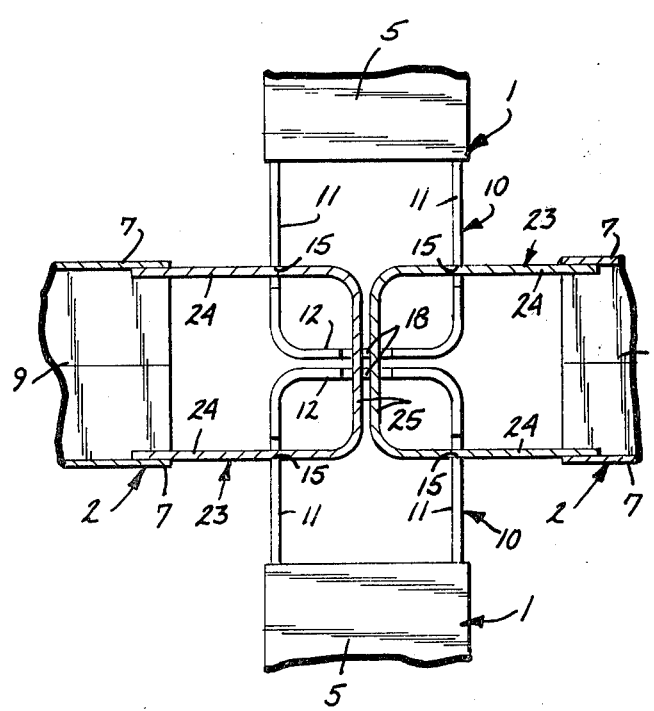
FIG. 7 is an enlarged fragmentary view, partly in plan and partly in horizontal section, of the area within the circle A of FIG. 6.
Figure 8:
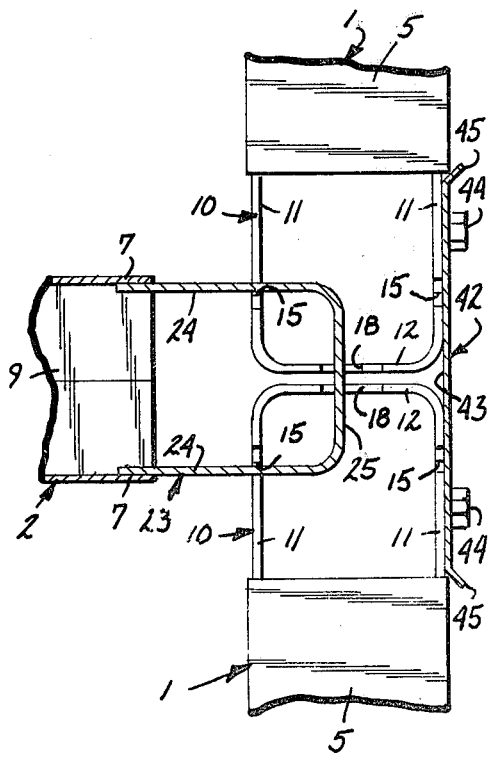
FIG. 8 is an enlarged fragmentary view, partly in top plan and partly in horizontal section, of the structure within the circle B of FIG. 6.

The arrangement shown in FIGS. 6–8 illustrates the ability of the panels 1 and 2 and their respective connector elements 10 and 23 to provide multiple bin or enclosure assemblies. The assembly illustrated in FIG. 6 provides for four separate bins indicated at 36, 37, 38 and 39. The outer walls and partitions are assembled in the same manner as the enclosure or bin illustrated in FIG. 1, outer wall sections being indicated at 40 and partition sections being indicated at 41. At the center of the structure of FIG. 6, the several partitions 41 are all interlocked together by utilizing all of the slots in the side wall portions 11 in interengaging and interlocking relationship, and each of the slots 18 and 19 in the transverse wall portions 12 and the slots 29 in the transverse wall portions 25 containing portions of two cooperating transverse wall portions. Thus, all of the panels of the partitions 41 are interlocked at their inner ends. FIG. 8 illustrates how the outer wall sections 40 are interlocked with the outer ends of respective ones of the partitions 41. Adjacent ends of the wall sections 40 at their junction with the partitions 41 are provided with flat closure strips 42 having inner surfaces 43, laterally spaced portions of which engage the outer surfaces of the outer side wall portions 11 of adjacent ones of the connector members 10 and 23. As shown in FIG. 8, machine screws or like fastening means 44, like the screws 35, are used to cover the otherwise exposed slots in the outer wall portions 11 and to further tie the whole assembly together. For the purpose of ease of assembly, the closure strips 32 and 42 have their longitudinal edges formed to provide angularly outwardly projecting flanges 34.

In the modified form of the invention illustrated in FIGS. 9–12, generally rectangular panels, similar to the panels 1, are indicated at 46 and are provided at their opposite ends with connector elements 47 similar to the connector elements 10. The panels 46 have opposite sidewalls 48 and the connector elements 47 have flat side wall portions 49 that are welded or otherwise rigidly secured to adjacent ones of the panel side walls 48. The connector side wall portions 49 are provided at their opposite ends with longitudinally extending slots or notches 50 substantially identical to the slots 15 and 16. Each connector element 47 further includes a flat transverse wall 51 substantially identical to the flat transverse wall 12 of each connector element 10, the transverse wall 51 being provided at its opposite ends with longitudinally extended notches or slots 52 substantially identical to the slots or notches 19. As shown, the connector element side wall portions 49 are substantially parallel to the sides 48 of the panel 46 and project laterally outwardly therefrom, each connector element 47 cooperating with its respective panel 46 to define an open ended passageway extending substantially the length of the panel 46. Each panel 46 is provided with top and bottom walls 53 and 54 respectively similar to the top and bottom walls 5 and 6.

Each connector element 47 is provided at its opposite ends with a pair of end connector portions in the nature of transverse bars 55 that are welded or otherwise rigidly secured at their opposite ends to their respective connector side wall portions 49 in laterally inwardly spaced parallel relationship to their respective transverse wall portions 51 and slots 50. The bars 55 are formed to provide laterally inwardly projecting flanges 56 that extend longitudinally to the adjacent end of their respective connector side wall portions 49.

Generally centrally between its ends, each connector side wall portion 49 is pierced and formed to provide a cross sectionally L-shaped intermediate connector portion 57 that extends longitudinally of its respective connector side wall portion 49. Preferably, the flanges 56 of the transverse bars 55 are of greater length longitudinally of the connector elements 47 than one-half of the longitudinal dimension of the intermediate connector portions 57.

It will be appreciated that half-panels similar to the panels 2 may be provided with end connector portions such as cross bars 55 with their respective flanges 56 for engagement with intermediate connector portions 57 of adjacent panels 46 when the same are interconnected to form a vertical wall structure. When wall panels 46 are interconnected, as shown in FIGS. 11 and 12 one-half of the length of each intermediate connector portion 57 is disposed in hooking engagement with each adjacent flange 56 of a pair of superimposed and aligned panels 46, as shown fragmentarily in FIG. 12.

It will be appreciated that, not only do the interconnected connector portions 55 and 57 aid materially in providing a secure interlocking engagement between panels, but the transverse bars 55 provide substantial reinforcement for the material of the side wall portions 49 to prevent distortion of the end portions of the connector elements 47 when the wall structure formed by the panels 46 is subject to extreme lateral or transverse loads.

While I have shown and described a commercial embodiment of wall forming panels and self-locking connector means therefor, and a modified form of connector means, it will be understood that the same is capable of further modification without departure from the spirit and scope of the invention, as defined in the claims.

What is claimed is:

1. In combination, a plurality of generally rectangular wall panels each having spaced parallel side walls, opposed top and bottom surfaces, opposite vertically extended ends, and self locking connector elements at said opposite ends; each of said connector elements extending substantially the full vertical length of its respective panel and comprising laterally spaced generally flat side wall portions and a generally flat transverse wall portion connecting said side wall portions; said side wall portions projecting outwardly from the panel ends in planes parallel to the planes of said panel side walls and rigidly connected to the panel side walls; said side wall portions and transverse wall portions of each connector element cooperating with its respective panel to define an open ended passageway and having opposite ends adjacent respective ones of said top and bottom surfaces of the panel; said transverse wall portion and at least one of said side wall portions of each connector element each having a pair of aligned longitudinal slots extending from opposite ends of their respective connector element longitudinally of the passageway defined thereby; each slot having a bottom disposed in spaced relationship to the bottom of the slot aligned therewith; the slots of the transverse wall portion and one side wall portion of each connector element being arranged to receive the transverse wall portion and one of the side wall portions of another connector element beyond the bottom of the slots thereof when said panels are moved into interlocking relationship at generally right angles to each other.

2. The combination defined in claim 1 in which at least one of the sidewall portions of each connector element includes end connector portions at the opposite ends thereof and intermediate connector portions generally centrally between said opposite ends, for interconnection between an end connector portion of one connector element with the intermediate connector portion of a connector element interconnected therewith when the panels of said connector elements are disposed in said interlocking relationship at said generally right angles to each other.

3. The combination defined in claim 2 in which said intermediate connector portions project outwardly from their respective side wall portions, said end connector portions being disposed within said passageway.

4. The combination defined in claim 3 in which said end connector portions comprise rigid bar members extending transversely of said passageways and having opposite ends secured each to a different sidewall portion of its respective connector element.

5. The combination defined in claim 4 in which each bar member includes a pair of flange portions each projecting longitudinally toward an adjacent end of its respective connector element for engagement with a cooperating one of said intermediate connector portions.

6. The combination defined in claim 4 in which said intermediate connector portions comprise cross sectionally L-shaped flanges extending longitudinally of their respective sidewall portions.

7. The connector means defined in claim 1 in which the bottoms of said aligned slots are spaced apart a distance substantially equal to one-half the distance between the ends of their respective connector elements, said slots being of substantially equal depth longitudinally of their respective connector elements.

8. The connector means defined in claim 7 in which both of said laterally spaced side wall portions have said aligned slots extending from said opposite ends of their respective connector element longitudinally of said passageway defined thereby.

* * * * *